United States Patent
Yamanaka et al.

(10) Patent No.: US 11,018,357 B2
(45) Date of Patent: May 25, 2021

(54) FUEL CELL SYSTEM AND METHOD OF CONTROLLING FUEL CELL

(71) Applicant: TOYOTA JIDOSHA KABUSHIKI KAISHA, Toyota (JP)

(72) Inventors: Tornio Yamanaka, Nagoya (JP); Kenji Umayahara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 16/239,467

(22) Filed: Jan. 3, 2019

(65) Prior Publication Data
US 2019/0267646 A1    Aug. 29, 2019

(30) Foreign Application Priority Data
Feb. 26, 2018   (JP) .............................. JP2018-032307

(51) Int. Cl.
| | | |
|---|---|---|
| *H01M 8/22* | (2006.01) | |
| *H01M 8/04082* | (2016.01) | |
| *H01M 8/04746* | (2016.01) | |
| *H01M 8/1004* | (2016.01) | |
| *H01M 8/0438* | (2016.01) | |
| *H01M 8/04537* | (2016.01) | |

(52) U.S. Cl.
CPC ... *H01M 8/04197* (2016.02); *H01M 8/04402* (2013.01); *H01M 8/04559* (2013.01); *H01M 8/04761* (2013.01); *H01M 8/1004* (2013.01)

(58) Field of Classification Search
CPC ......... H01M 8/04197; H01M 8/04082; H01M 8/04089; H01M 8/04; H01M 8/04388; H01M 8/04402; H01M 8/04559; H01M 8/04544; H01M 8/04552; H01M 8/04761; H01M 8/04753; H01M 8/1004
See application file for complete search history.

(56) References Cited

U.S. PATENT DOCUMENTS

2006/0286420 A1    12/2006 Koyama et al.
2013/0164645 A1*    6/2013 Takaichi ........... H01M 8/04671
                                                      429/432

FOREIGN PATENT DOCUMENTS

| JP | 2006216459 A | * | 8/2006 |
| JP | 2006-351396 A | | 12/2006 |
| JP | 2009037884 A | * | 2/2009 |
| JP | 2010-257731 A | | 11/2010 |
| JP | 2012089306 A | * | 5/2012 |

* cited by examiner

*Primary Examiner* — Raymond Alejandro
(74) *Attorney, Agent, or Firm* — Oliff PLC (57) ABSTRACT

A fuel cell system includes: a fuel cell in which a plurality of cells are stacked; a voltage sensor configured to measure a cell voltage of the fuel cell; and a pressure sensor configured to measure an anode gas pressure in the fuel cell. When the cell voltage is lower than a predetermined threshold voltage, in a state in which an amount of supply of cathode gas to the fuel cell is secured, and a rate of decrease in the anode gas pressure is larger than a predetermined threshold rate, it is determined that a cross leak abnormality has occurred in the fuel cell.

5 Claims, 5 Drawing Sheets

FUEL CELL SYSTEM AND METHOD OF CONTROLLING FUEL CELL

CROSS REFERENCE TO RELATED APPLICATIONS

This application is based upon and claims the benefit of priority from Japanese patent application No. 2018-032307, filed on Feb. 26, 2018, the disclosure of which is incorporated herein in its entirety by reference.

BACKGROUND

The present disclosure relates to a fuel cell system and a method of controlling a fuel cell.

In recent years, solid polymer electrolyte type fuel cells have been focused on as fuel cells for automobiles. A solid polymer electrolyte type fuel cell includes a cell stack in which a number of unit cells are stacked. Each unit cell includes a Membrane/Electrode Assembly (MEA) in which a polymer electrolyte membrane is interposed between a pair of electrodes and a pair of separators between which the MEA is interposed. The fuel cell generates power through an oxidation-reduction reaction of oxygen gas in air supplied via the separator on the cathode side and hydrogen gas supplied via the separator on the anode side.

In the aforementioned fuel cell, when a failure such as "perforation", in which a hole is formed in a cell membrane, or "a membrane tear", which is a tear in a cell membrane, occurs, a cross leak abnormality, which is an increase in the cross leak of the cathode side and the anode side, occurs. When the cross leak abnormality occurs, a cell voltage is reduced. Therefore, in the fuel cell system disclosed in Japanese Unexamined Patent Application Publication No. 2006-351396, for example, it is determined whether a cross leak abnormality has occurred based on a reduction in the cell voltage.

SUMMARY

The present inventors have found the following problem regarding the fuel cell system. As described above, in the fuel cell system disclosed in Japanese Unexamined Patent Application Publication No. 2006-351396, it is determined whether a cross leak abnormality has occurred based on the reduction in the cell voltage.

However, the reduction in the cell voltage may occur not only because of the aforementioned cross leak abnormality due to the perforation or the membrane tear but also because of, for example, an abnormality of an air supply/exhaust system such as a rotation failure of a compressor or a failure in a pressure regulating valve or a flow dividing valve. That is, in the fuel cell system disclosed in Japanese Unexamined Patent Application Publication No. 2006-351396, there is a problem that it is impossible to distinguish a cross leak abnormality from other abnormalities.

The present disclosure has been made in view of the aforementioned circumstances and provides a fuel cell system capable of detecting a cross leak abnormality and other abnormalities separately from each other.

A fuel cell system according to the present disclosure is a fuel cell system including:

a fuel cell in which a plurality of cells are stacked;

a voltage sensor configured to measure a cell voltage of the fuel cell; and a pressure sensor configured to measure an anode gas pressure in the fuel cell, in which when the cell voltage is lower than a predetermined threshold voltage in a state in which an amount of supply of cathode gas to the fuel cell is secured, and a rate of decrease in the anode gas pressure is larger than a predetermined threshold rate, it is determined that a cross leak abnormality has occurred in the fuel cell.

In the fuel cell system according to the present disclosure, when the cell voltage is lower than a predetermined threshold voltage in the state in which the amount of supply of cathode gas to the fuel cell is secured, and the rate of decrease in the anode gas pressure is larger than a predetermined threshold rate, it is determined that a cross leak abnormality has occurred in the fuel cell. It is only when a cross leak abnormality occurs that both the reduction in the cell voltage and the increase in the rate of decrease in the anode gas pressure occur at the same time. Further, in the fuel cell system, a probability that not only a cross leak abnormality but also other abnormalities occur at the same time is extremely low. Therefore, according to the fuel cell system of the present disclosure, it is possible to detect a cross leak abnormality and other abnormalities separately from each other.

The determination based on the cell voltage and the determination based on the rate of decrease in the anode gas pressure may be performed during a period from start to stop of the fuel cell system. By making various conditions uniform, it is possible to improve the determination accuracy.

The determination based on the cell voltage may be performed during an intermittent operation. During the intermittent operation, the fuel cell generates no electric power and the cell voltage is maintained. It is therefore possible to improve the determination accuracy based on the cell voltage.

The determination based on the rate of decrease in the anode gas pressure may be performed after stop of supply of the anode gas in processing of stopping the fuel cell system. It is therefore possible to improve the determination accuracy based on the rate of decrease in the anode gas pressure.

A method of controlling a fuel cell according to the present disclosure is a method of controlling a fuel cell in which a plurality of cells are stacked, the method including:

determining whether a cross leak abnormality has occurred based on a cell voltage of the fuel cell in a state in which an amount of supply of cathode gas to the fuel cell is secured; and determining whether a cross leak abnormality has occurred based on a rate of decrease in an anode gas pressure in the fuel cell, in which when the cell voltage is lower than a predetermined threshold voltage and the rate of decrease in the anode gas pressure is larger than a predetermined threshold rate, it is determined that a cross leak abnormality has occurred in the fuel cell.

In the method of controlling the fuel cell according to the present disclosure, when the cell voltage is smaller than a predetermined threshold voltage and the rate of decrease in the anode gas pressure is larger than a predetermined threshold rate, it is determined that a cross leak abnormality has occurred in the fuel cell. It is only when a cross leak abnormality occurs that both the reduction in the cell voltage and the increase in the rate of decrease in the anode gas pressure occur at the same time. Further, in the fuel cell system, a probability that not only a cross leak abnormality but also other abnormalities occur at the same time is extremely low. Therefore, according to the fuel cell system of the present disclosure, it is possible to detect a cross leak abnormality and other abnormalities separately from each other.

According to the present disclosure, it is possible to provide a fuel cell system capable of detecting a cross leak abnormality and other abnormalities separately from each other.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of the disclosure will be described in detail with reference to the accompanying drawings. However, the disclosure is not limited to the embodiments. For the purpose of clear explanation, the following description and the drawings are appropriately simplified.

First Embodiment

<Configuration of Fuel Cell System>

Figure 1:
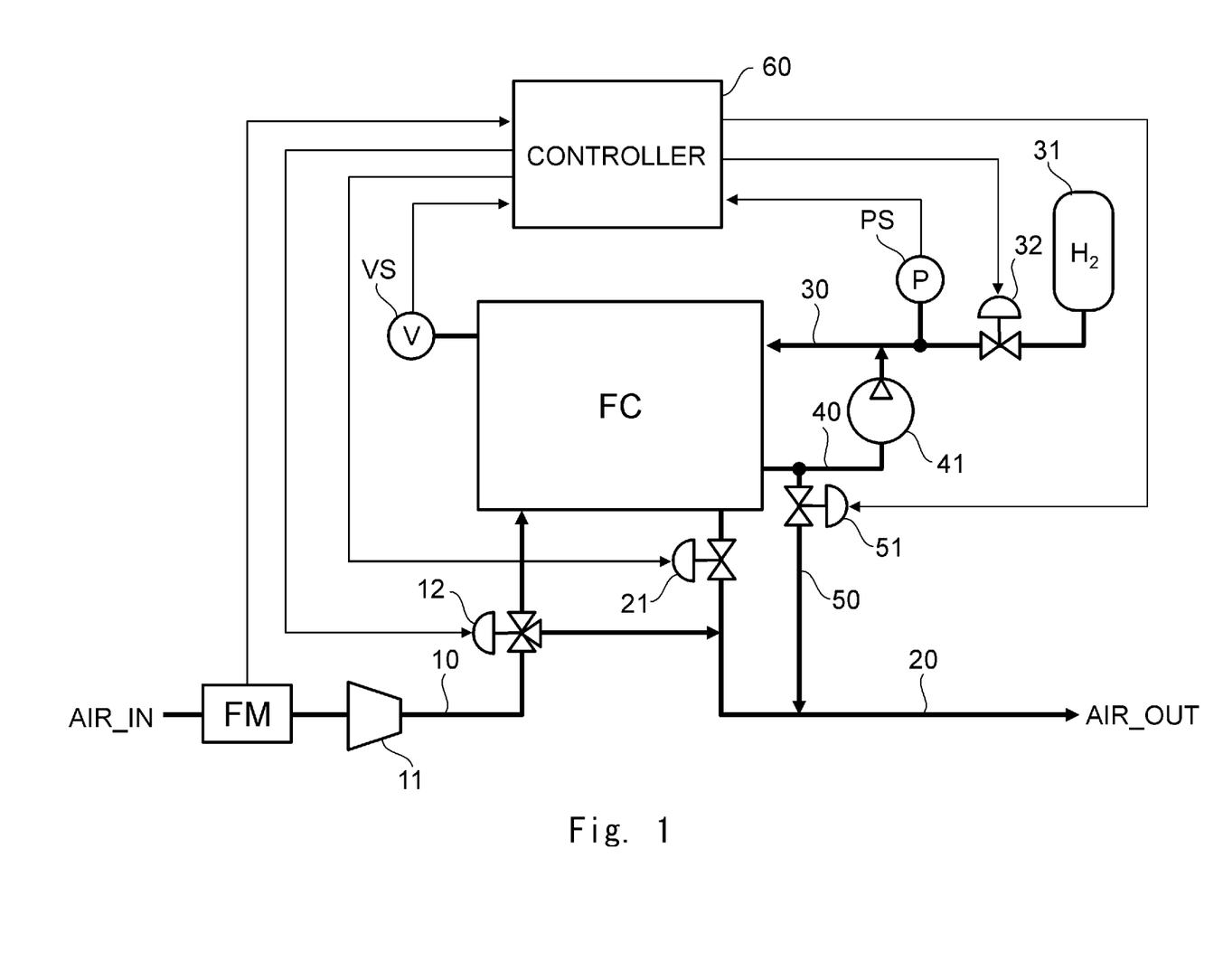
FIG. 1 is a configuration diagram of a fuel cell system according to a first embodiment.

First, referring to FIG. 1, a configuration of a fuel cell system according to a first embodiment will be explained. FIG. 1 is a configuration diagram of the fuel cell system according to the first embodiment. As shown in FIG. 1, the fuel cell system according to the first embodiment includes a fuel cell FC, an air supply path 10, a compressor 11, a flow dividing valve 12, an air discharge path 20, a pressure regulating valve 21, a hydrogen supply path 30, a hydrogen tank 31, an injector 32, a hydrogen circulation path 40, a circulation pump 41, a hydrogen discharge path 50, an exhaust valve 51, a controller 60, a flowmeter FM, a voltage sensor VS, and a pressure sensor PS.

In this embodiment, as one example, a fuel cell system to be applied to a fuel cell automobile will be explained. The fuel cell automobile drives a motor by electricity generated by the fuel cell FC and travels. Note that the fuel cell system according to the first embodiment is not limited to being applied to fuel cell automobiles and may be applied to other applications.

The fuel cell FC, which is a solid polymer electrolyte type fuel cell, includes a cell stack in which a number of unit cells are stacked. Each unit cell includes a Membrane/Electrode Assembly (MEA) in which a polymer electrolyte membrane is interposed between an anode electrode and a cathode electrode and a pair of separators between which the MEA is interposed. The fuel cell FC generates power through an oxidation-reduction reaction of oxygen gas in air supplied via the separator on the cathode side and hydrogen gas supplied via the separator on the anode side.

Specifically, the oxidation reaction shown in Expression (1) occurs in the anode electrode, and the reduction reaction shown in Expression (2) occurs in the cathode electrode. Further, the chemical reaction shown in Expression (3) occurs in the entire fuel cell FC.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

As shown in FIG. 1, the voltage sensor VS that measures the cell voltage is attached to the fuel cell FC. The cell voltage measured by the voltage sensor VS is input to the controller 60 and is used for a determination of a cross leak abnormality. The voltage of the fuel cell FC, that is, the voltage of the entire cell stack, (hereinafter this voltage will be referred to as an FC voltage) may be measured or the voltage of each unit cell (hereinafter this voltage will be referred to as a unit cell voltage) may be measured by the voltage sensor VS. The FC voltage is equal to the total value of the unit cell voltages. The cell voltage such as the FC voltage, the minimum cell voltage (minimum value of the unit cell voltages), or the average cell voltage (average value of the unit cell voltages) may be used for the determination of the cross leak abnormality.

In this specification, the FC voltage, the unit cell voltage, the minimum cell voltage, the average cell voltage and the like are collectively referred to as a cell voltage.

The air supply path 10 is a gas pipe for supplying air, which is oxidation gas (cathode gas), to the fuel cell FC.

The compressor 11 is provided on the air supply path 10. The compressor 11 compresses air (AIR_IN) which has been taken in from outside of the system and sends the compressed air to the fuel cell FC.

As shown in FIG. 1, the flow rate of the air to be introduced into the compressor 11 (air flow rate) is measured by the flowmeter FM provided on the air supply path 10. The air flow rate measured by the flowmeter FM is input to the controller 60.

Further, the air compressed by the compressor 11 is supplied to the fuel cell FC via the flow dividing valve 12. The flow dividing valve 12 can divide the air compressed by the compressor 11 into the air to be supplied to the fuel cell FC and that to the air discharge path 20. The dividing ratio by the flow dividing valve 12 is determined by the opening degree of the flow dividing valve 12 and that of the pressure regulating valve 21 that will be described later. The opening degree of the flow dividing valve 12 and that of the pressure regulating valve 21 are controlled by the controller 60.

The air discharge path 20 is a gas pipe for discharging air after the reaction from the fuel cell FC.

The pressure regulating valve 21 is provided on the air discharge path 20. The air pressure (cathode pressure) in the fuel cell FC is adjusted by the pressure regulating valve 21. The air (AIR_OUT) that has passed the pressure regulating valve 21 is released to the outside of the system.

The hydrogen supply path 30 is a gas pipe for supplying the hydrogen gas, which is the fuel gas (anode gas), to the fuel cell FC.

The hydrogen tank 31 is provided at the end of the hydrogen supply path 30. The hydrogen tank 31 stores, for example, high-pressure hydrogen gas. The high-pressure hydrogen gas is depressurized by the injector 32 provided on the hydrogen supply path 30 and then the depressurized hydrogen gas is supplied to the fuel cell FC. The pressure of the hydrogen gas in the fuel cell FC (anode gas pressure) is adjusted by opening or closing the injector 32. Opening and closing of the injector 32 are controlled by the controller 60.

The pressure sensor PS is provided on the hydrogen supply path 30 between the injector 32 and the fuel cell FC. The anode gas pressure in the fuel cell FC is measured by the pressure sensor PS. The anode gas pressure measured by the pressure sensor PS is input to the controller 60 and is used for a determination of a cross leak abnormality.

The hydrogen circulation path 40 is a gas pipe for returning the hydrogen gas discharged from the fuel cell FC to the hydrogen supply path 30.

The circulation pump 41 is provided on the hydrogen circulation path 40. The circulation pump 41 pressurizes the hydrogen gas discharged from the fuel cell FC and sends the pressurized hydrogen gas to the hydrogen supply path 30.

The hydrogen discharge path 50 is a gas pipe for discharging hydrogen gas whose concentration has been decreased from the hydrogen circulation path 40. The hydrogen discharge path 50 is provided with the exhaust valve 51. The hydrogen discharge path 50 is connected to the air discharge path 20 in such a way that the hydrogen gas discharged from the hydrogen circulation path 40 via the exhaust valve 51 is not directly released to the outside of the system.

The controller 60 controls operations of various devices in the fuel cell system. In particular, as shown in FIG. 1, in the fuel cell system according to this embodiment, the controller 60 determines whether a cross leak abnormality has occurred based on the cell voltage measured by the voltage sensor VS and the anode gas pressure measured by the pressure sensor PS. The controller 60 determines whether a cross leak abnormality has occurred based on the FC voltage in a state in which the amount of the air supplied to the fuel cell FC has been secured. As shown in FIG. 1, the controller 60 determines whether the amount of the air supplied to the fuel cell FC has been secured based on the air flow rate measured by the flowmeter FM and the dividing ratio defined by the opening degree of the flow dividing valve 12 and that of the pressure regulating valve 21.

As described above, in the fuel cell system according to this embodiment, the controller 60 determines whether a cross leak abnormality has occurred based on, besides the cell voltage measured by the voltage sensor VS, the anode gas pressure measured by the pressure sensor PS. It is therefore possible to detect a cross leak abnormality and other abnormalities separately from each other. The reasons therefor will be specifically described below.

In the fuel cell FC, when a failure such as "perforation", in which a hole is formed in a cell membrane, or "a membrane tear", which is a tear in a cell membrane, occurs, a cross leak abnormality, which is an increase in the cross leak of the cathode side and the anode side, occurs. When the cross leak occurs, the cell voltage is reduced and the rate of decrease in the anode gas pressure increases. Therefore, it may be possible to detect the cross leak abnormality from the reduction in the cell voltage or the increase in the rate of decrease in the anode gas pressure.

However, the reduction in the cell voltage may occur not only because of a cross leak abnormality but also because of, for example, an abnormality of an air supply/exhaust device such as the compressor 11, the pressure regulating valve 21, or the flow dividing valve 12. Therefore, the reduction in the cell voltage alone is not sufficient to distinguish a cross leak abnormality from other abnormalities.

On the other hand, the increase in the rate of decrease in the anode gas pressure may occur not only because of a cross leak abnormality but also because of, for example, an abnormality of the exhaust valve 51 or a damage in the hydrogen circulation path 40. Therefore, the increase in the rate of decrease in the anode gas pressure alone is not sufficient to distinguish a cross leak abnormality from other abnormalities.

However, it is only when a cross leak abnormality occurs that both the reduction in the cell voltage and the increase in the rate of decrease in the anode gas pressure occur at the same time. Further, in the fuel cell system, a probability that not only a cross leak abnormality but also other abnormalities occur at the same time is extremely low. Therefore, the controller 60 determines whether a cross leak abnormality has occurred based on both the reduction in the cell voltage and the increase in the rate of decrease in the anode gas pressure, whereby it is possible to detect a cross leak abnormality and other abnormalities separately from each other. In this way, in the fuel cell system according to this embodiment, it is possible to detect a cross leak abnormality and other abnormalities separately from each other.

<Method of Controlling Fuel Cell System>

Figure 2:
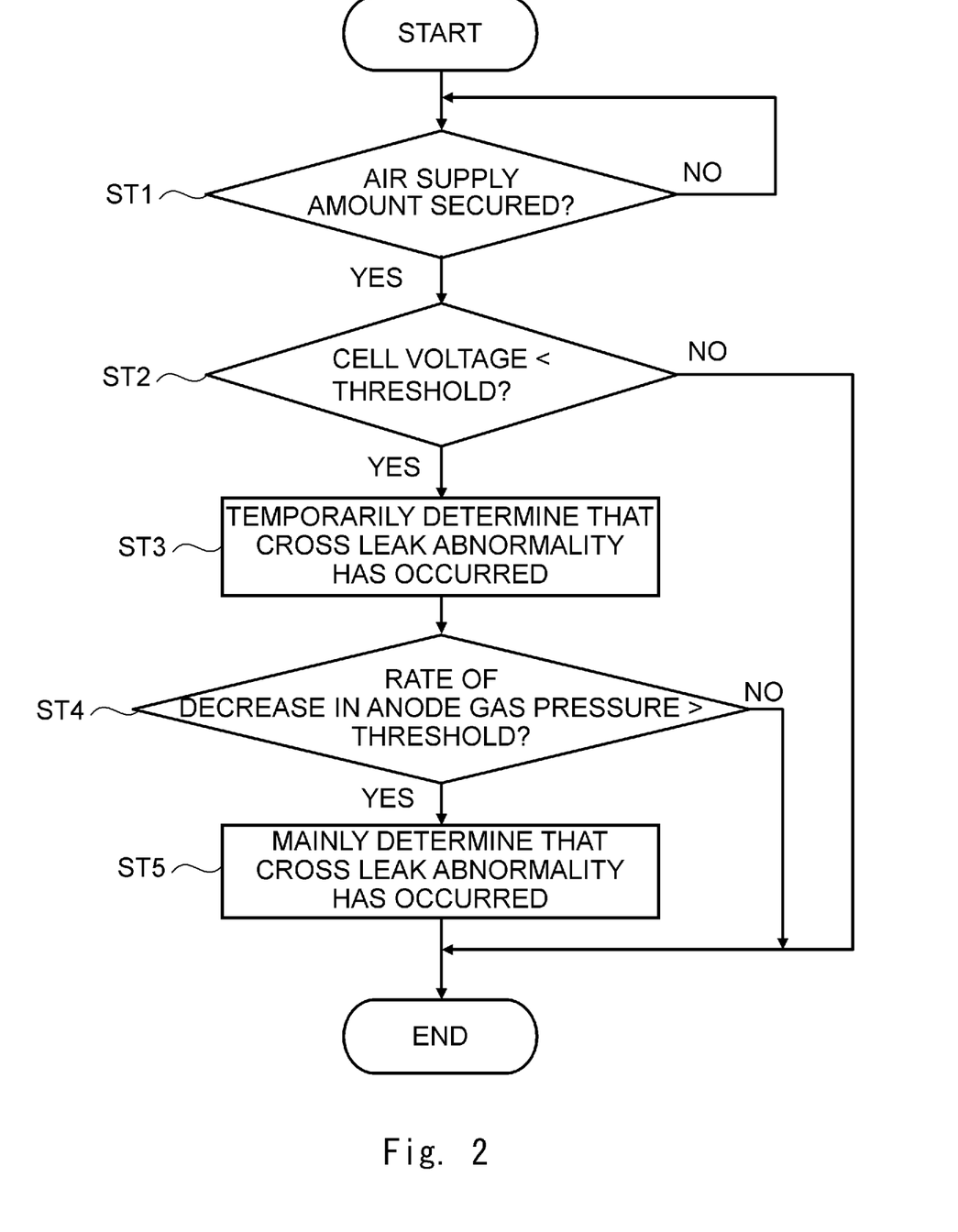
FIG. 2 is a flowchart showing a method of controlling a fuel cell according to the first embodiment.

Referring next to FIG. 2, a method of controlling the fuel cell according to the first embodiment will be explained. FIG. 2 is a flowchart showing the method of controlling the fuel cell according to the first embodiment. More specifically, FIG. 2 shows a method of determining whether a cross leak abnormality has occurred in the fuel cell FC. In the description regarding FIG. 2 described below, FIG. 1 is also referred to as appropriate.

First, as shown in FIG. 2, the controller 60 determines whether the amount of the air supplied to the fuel cell FC has been secured (Step ST1). Specifically, the controller 60 determines whether the amount of the air supplied to the fuel cell FC has been secured based on the air flow rate measured by the flowmeter FM and the dividing ratio defined by the opening degree of the flow dividing valve 12 and that of the pressure regulating valve 21.

When the amount of the air supplied to the fuel cell FC has not been secured (NO in Step ST1), the controller 60 waits until the amount of the air supplied to the fuel cell FC is secured. That is, Step ST1 is repeated. When the amount of the air supplied to the fuel cell FC has been secured (YES in Step ST1), the controller 60 determines whether the cell voltage measured by the voltage sensor VS is smaller than a predetermined threshold voltage (Step ST2).

When the cell voltage is equal to or larger than a predetermined threshold voltage (NO in Step ST2), the controller 60 determines that a cross leak abnormality has not occurred, and the determination operation is ended. When the cell voltage is smaller than the predetermined threshold voltage (YES in Step ST2), the controller 60 temporarily determines that a cross leak abnormality has occurred (Step ST3). The reduction in the cell voltage may occur not only because of a cross leak abnormality but also because of, for example, an abnormality of an air supply/exhaust device such as the compressor 11, the pressure regulating valve 21, or the flow dividing valve 12. Therefore, the reduction in the cell voltage alone is not sufficient to distinguish a cross leak abnormality from other abnormalities. Accordingly, the controller 60 temporarily determines that a cross leak abnormality has occurred.

Figure 3:
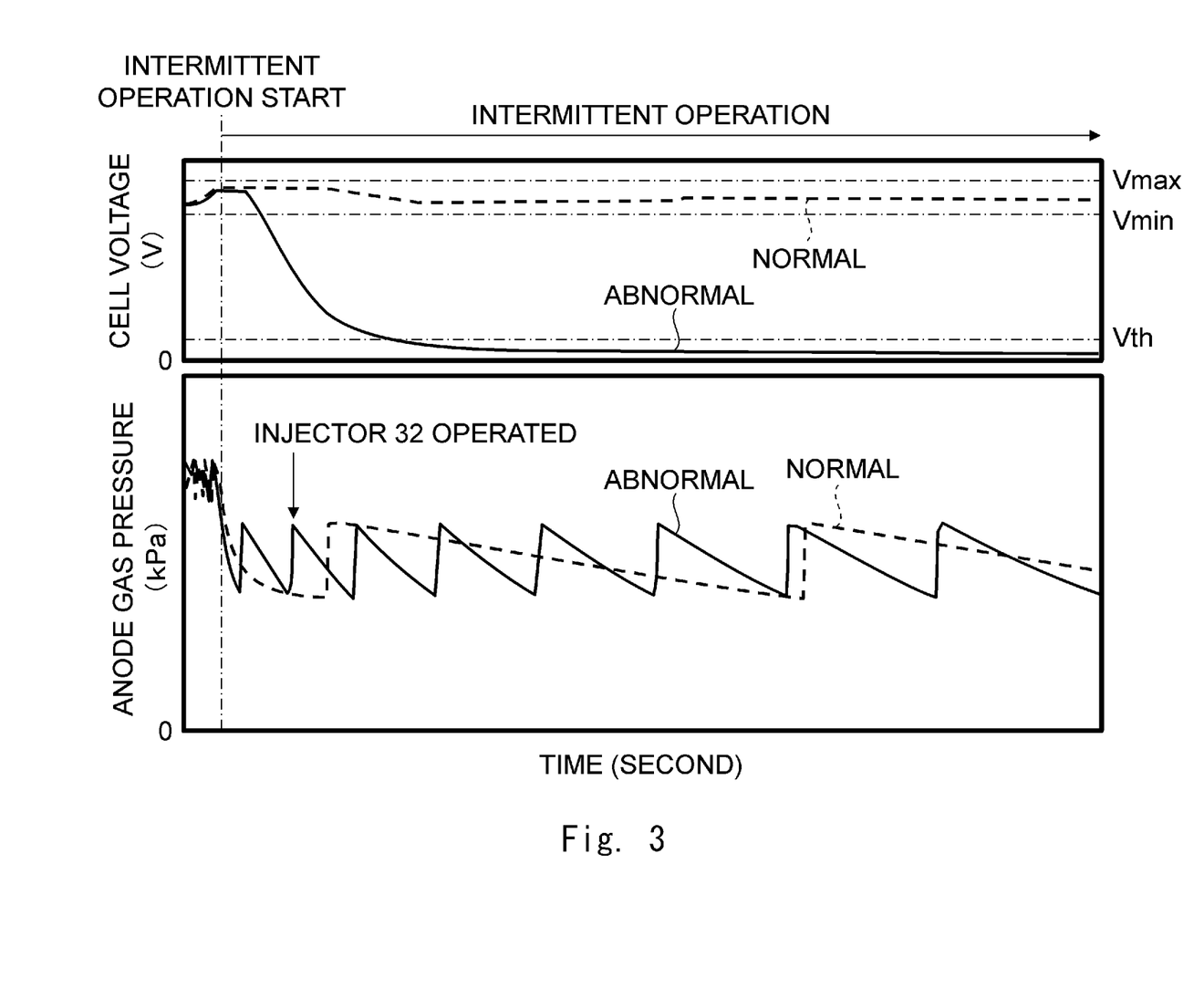
FIG. 3 is a graph showing a change over time of a cell voltage and an anode gas pressure during an intermittent operation.

FIG. 3 is a graph showing a change over time of the cell voltage and the anode gas pressure during an intermittent operation. The vertical axis in the upper graph of FIG. 3 indicates the cell voltage (V) and the vertical axis in the lower graph indicates the anode gas pressure (kPa). The horizontal axis in the upper graph and that in the lower graph both indicate time. The intermittent operation corresponds to a state in which the fuel cell FC generates no electric power and the amount of the air supplied to the fuel cell FC is secured in order to maintain the cell voltage. Therefore, the determination accuracy based on the reduction in the cell voltage is improved.

As shown by a dashed line in the upper graph of FIG. 3, in a normal case in which a cross leak abnormality does not occur, the cell voltage is maintained between a control lower limit voltage Vmin and a control upper limit voltage Vmax. On the other hand, as shown by a solid line in the upper graph in FIG. 3, when a cross leak abnormality occurs, the cell voltage is abruptly decreased and becomes lower than a threshold voltage Vth. The threshold voltage Vth is smaller than the control lower limit voltage Vmin but is larger than a concentration cell voltage. The threshold voltage Vth is, for example, about 5 to 30% of the control target voltage (e.g., the intermediate value of the control lower limit voltage Vmin and the control upper limit voltage Vmax). The control target voltage of the unit cell voltage is about 1.0 V.

Next, the controller 60 determines whether the rate of decrease in the anode gas pressure measured by the pressure sensor PS is larger than a predetermined threshold rate (Step ST4). When the rate of decrease in the anode gas pressure is equal to or smaller than the predetermined threshold rate (NO in Step ST4), the controller 60 determines that a cross leak abnormality has not occurred, and the determination operation is ended. When the rate of decrease in the anode gas pressure is larger than the predetermined threshold rate (YES in Step ST4), the controller 60 makes a main determination that a cross leak abnormality has occurred (Step ST5), and the determination operation is ended.

As shown by a dashed line in the lower graph in FIG. 3, in the normal case in which a cross leak abnormality does not occur, the rate of decrease in the anode gas pressure is small. On the other hand, as shown by a solid line in the lower graph in FIG. 3, when a cross leak abnormality occurs, the rate of decrease in the anode gas pressure becomes large. The threshold rate is made larger than the rate of decrease in the anode gas pressure in a normal cell in which the cross leak amount is an allowable maximum value. Further, the threshold rate may be determined in view of an error in the pressure sensor PS or the like.

As shown in the lower graph of FIG. 3, when the anode gas pressure measured by the pressure sensor PS decreases to a predetermined pressure during the intermittent operation, the injector 32 is operated, the hydrogen gas is supplied, and the anode gas pressure is increased. In the normal case in which a cross leak abnormality does not occur, the rate of decrease in the anode gas pressure is small. Therefore, the operation interval of the injector 32 becomes long and the number of operations per hour becomes small. On the other hand, when a cross leak abnormality has occurred, the rate of decrease in the anode gas pressure becomes large. In this case, the operation interval of the injector 32 becomes short and the number of operations per hour becomes large.

Therefore, the rate of decrease in the anode gas pressure may be obtained from the operation interval of the injector 32, the number of operations per hour or the like.

Further, during the intermittent operation, the anode gas pressure is decreased a plurality of times. Therefore, the average value of the plurality of rates of decrease may be set to the rate of decrease in the anode gas pressure. It is therefore possible to further improve the determination accuracy.

The aforementioned determination series are preferably performed during a period from the start to stop of the fuel cell system, that is, during one trip in the fuel cell automobile. By making conditions such as the state of the fuel cell FC (e.g., temperature, moisture balance, and degree of degradation), the external environment (e.g., outside air temperature, humidity, and atmospheric pressure), or a driving method by a driver uniform, it is possible to improve the determination accuracy.

As described above, in the method of controlling the fuel cell according to this embodiment, it is temporarily determined in Steps ST2 and ST3 whether a cross leak abnormality has occurred based on the reduction in the cell voltage, and then it is mainly determined in Steps ST4 and ST5 whether a cross leak abnormality has occurred based on the increase in the rate of decrease in the anode gas pressure.

The reduction in the cell voltage may occur not only because of a cross leak abnormality but also because of, for example, an abnormality of an air supply/exhaust device such as the compressor 11, the pressure regulating valve 21, or the flow dividing valve 12. Therefore, the determination made based on the reduction in the cell voltage in Step ST2 alone is not sufficient to distinguish a cross leak abnormality from other abnormalities.

On the other hand, the increase in the rate of decrease in the anode gas pressure may occur not only because of a cross leak abnormality but also because of, for example, an abnormality of the exhaust valve 51 or a damage in the hydrogen circulation path 40. Therefore, the determination made based on the increase in the rate of decrease in the anode gas pressure in Step ST4 alone is not sufficient to distinguish a cross leak abnormality from other abnormalities.

However, it is only when a cross leak abnormality occurs that both the reduction in the cell voltage and the increase in the rate of decrease in the anode gas pressure occur at the same time. Further, in the fuel cell system, a probability that not only a cross leak abnormality but also other abnormalities occur at the same time is extremely low.

Accordingly, according to the method of controlling the fuel cell according to this embodiment in which a cross leak abnormality is determined based on both the reduction in the cell voltage and the increase in the rate of decrease in the anode gas pressure, it is possible to detect a cross leak abnormality and other abnormalities separately from each other.

Even when the order of Steps ST1-ST3 and Steps ST4-ST5 is switched, the effects similar to those stated above are obtained.

Second Embodiment

<Method of Controlling Fuel Cell>

Figure 4:
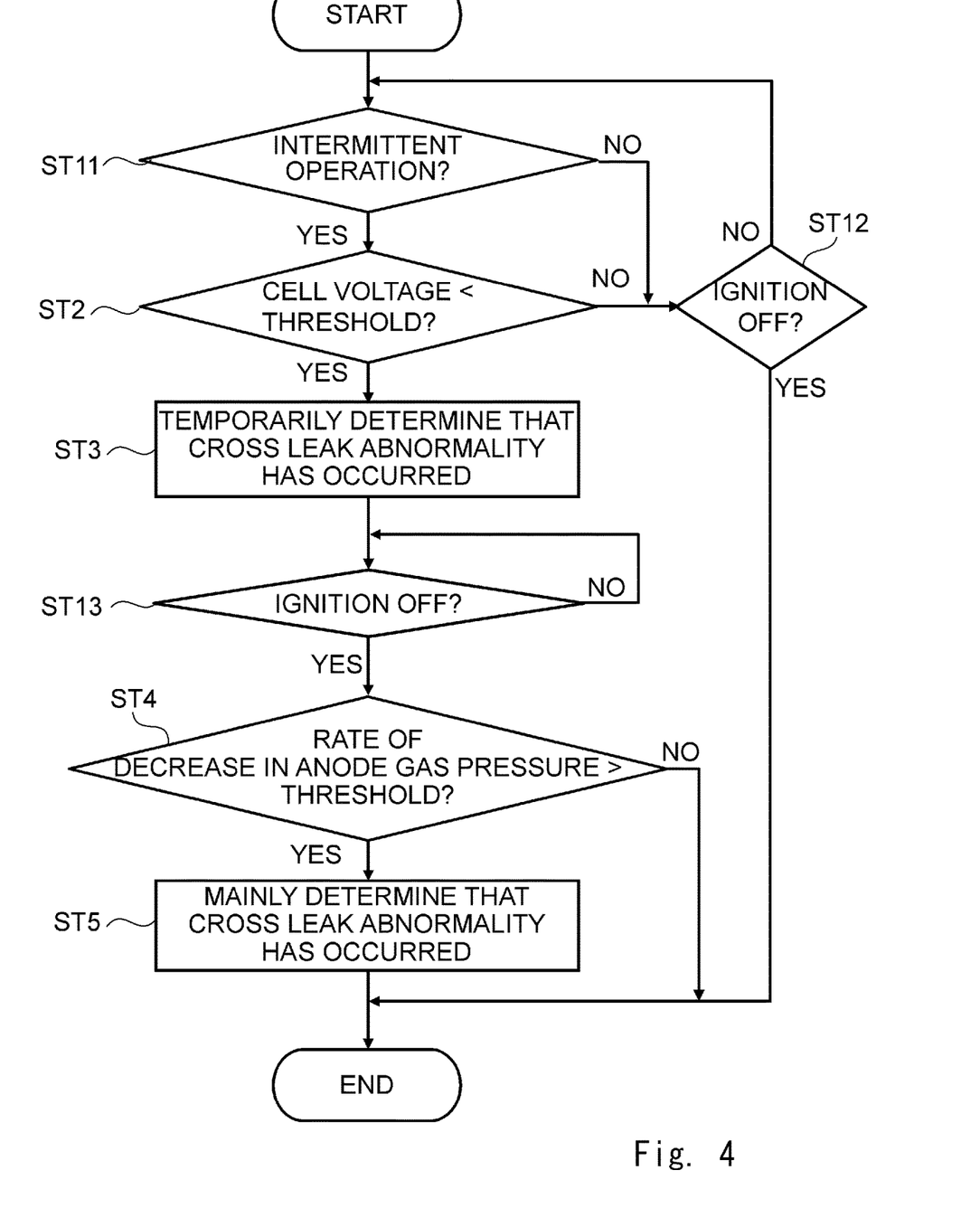
FIG. 4 is a flowchart showing a method of controlling a fuel cell according to a second embodiment.

Referring next to FIG. 4, a method of controlling a fuel cell according to a second embodiment will be explained. FIG. 4 is a flowchart showing the method of controlling the fuel cell according to the second embodiment. More specifically, FIG. 4 shows a method of determining whether a cross leak abnormality has occurred in the fuel cell FC. The configuration of the fuel cell system according to the second embodiment is similar to that of the fuel cell system according to the first embodiment shown in FIG. 1. In the description regarding FIG. 4 described below, FIG. 1 is also referred to as appropriate.

Steps ST2, ST3, ST4, and ST5 in FIG. 4 are similar to Steps ST2, ST3, ST4, and ST5 in FIG. 1.

First, as shown in FIG. 4, when the fuel cell system is started, the controller 60 determines whether the fuel cell FC is performing the intermittent operation (Step ST11). Step ST11 is a specific example of Step ST1 in FIG. 2. As described above, the intermittent operation corresponds to a state in which the fuel cell FC generates no electric power and the amount of the air supplied to the fuel cell FC is secured in order to maintain the cell voltage.

When the fuel cell FC is not performing the intermittent operation (NO in Step ST11), unless an ignition switch is turned off (NO in Step ST12), the controller 60 waits until the fuel cell FC starts the intermittent operation. That is, Step ST11 is repeated. On the other hand, when the ignition switch has been turned off (YES in Step ST12), the determination operation is ended. When the fuel cell FC is performing the intermittent operation (YES in Step ST11), the controller 60 determines whether the cell voltage measured by the voltage sensor VS is smaller than a predetermined threshold voltage (Step ST2).

When the cell voltage is equal to or larger than the predetermined threshold voltage (NO in Step ST2), unless the ignition switch is turned off (NO in Step ST12), the controller 60 waits until the intermittent operation is performed again. On the other hand, when the ignition switch has been turned off (YES in Step ST12), the determination operation is ended. When the cell voltage is smaller than the predetermined threshold voltage (YES in Step ST2), the controller 60 temporarily determines that a cross leak abnormality has occurred (Step ST3). In this way, until it is temporarily determined that a cross leak abnormality has occurred, the determination of the cross leak abnormality based on the reduction in the cell voltage (Step ST2) is repeated for each intermittent operation. Once it is temporarily determined that a cross leak abnormality has occurred, the process moves to a determination of a cross leak abnormality based on the increase in the rate of decrease in the anode gas pressure (Step ST4).

Next, the controller 60 determines whether the ignition switch has been turned off (Step ST13). When the ignition switch has not been turned off (NO in Step ST13), the controller 60 waits until the ignition switch is turned off. That is, Step ST13 is repeated. On the other hand, when the ignition switch has been turned off (YES in Step ST13), it is determined whether the rate of decrease in the anode gas pressure measured by the pressure sensor PS is larger than a predetermined threshold rate (Step ST4). Specifically, when the ignition switch is turned off, the controller 60 performs processing of stopping the fuel cell system. After the hydrogen supply from the injector 32 is stopped in the stopping processing, the controller 60 performs Step ST4.

When the rate of decrease in the anode gas pressure is equal to or smaller than the predetermined threshold rate (NO in Step ST4), the controller 60 determines that a cross leak abnormality has not occurred, and the determination operation is ended. When the rate of decrease in the anode gas pressure is larger than the predetermined threshold rate (YES in Step ST4), the controller 60 makes a main determination that a cross leak abnormality has occurred (Step ST5), and the determination operation is ended.

Figure 5:
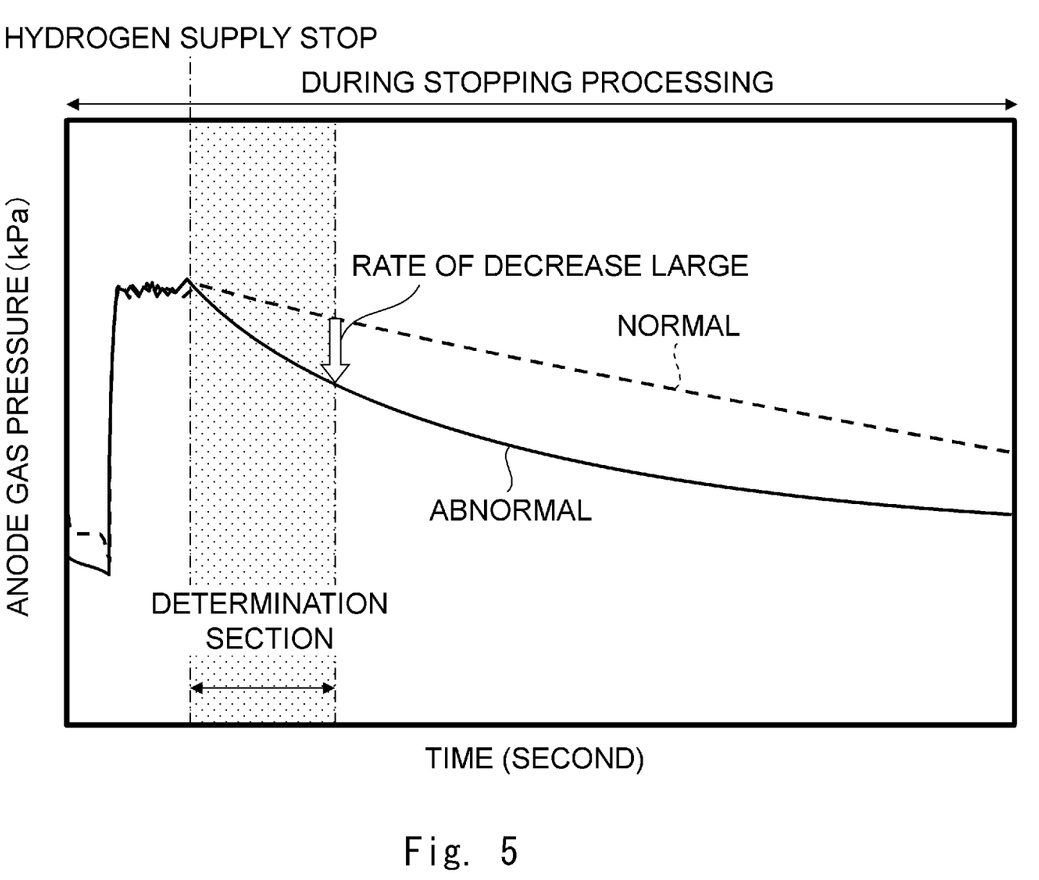
FIG. 5 is a graph showing a change over time of the anode gas pressure during stopping processing.

FIG. 5 is a graph showing a change over time of the anode gas pressure during the stopping processing. The vertical axis shown in FIG. 5 indicates the anode gas pressure (kPa) and the horizontal axis in FIG. 5 indicates time. As shown in FIG. 5, it is determined whether a cross leak abnormality has occurred based on the amount of decrease (i.e., the rate of decrease) in the anode gas pressure after a predetermined time (determination section) has passed since the stop of the hydrogen supply. In the normal case in which the cross leak abnormality does not occur, as shown by a dashed line in FIG. 5, the rate of decrease in the anode gas pressure is small. On the other hand, when a cross leak abnormality has occurred, as shown by a solid line in FIG. 5, the rate of decrease in the anode gas pressure becomes large.

In the example shown in FIG. 3 according to the first embodiment, the hydrogen supply from the injector 32 is repeatedly performed. On the other hand, in the example shown in FIG. 5 according to the second embodiment, after the hydrogen supply from the injector 32 is stopped, the determination based on the rate of decrease in the anode gas pressure is performed, whereby it is possible to improve the rate of the determination.

Further, as shown in FIG. 5, when the anode gas pressure is made high before the hydrogen supply is stopped, the rate of decrease in the anode gas pressure when a cross leak abnormality has occurred becomes large and the determination accuracy is improved.

The air supply on the cathode side is stopped along with the stop of hydrogen supply on the anode side. Therefore, the rate of increase in the cathode pressure may be used as the rate of decrease in the anode gas pressure.

As shown in FIG. 5, the aforementioned determination series are performed during a period from the start to stop of the fuel cell system, that is, during one trip of the fuel cell automobile. Therefore, by making conditions such as the state of the fuel cell FC (e.g., temperature, moisture balance, and degree of degradation), the external environment (e.g., outside air temperature, humidity, and atmospheric pressure), or a driving method by a driver uniform, it is possible to improve the determination accuracy.

As described above, in the method of controlling the fuel cell according to this embodiment as well, after it is temporarily determined in Steps ST2 and ST3 whether a cross leak abnormality has occurred based on the reduction in the cell voltage, it is mainly determined in Steps ST4 and ST5 whether a cross leak abnormality has occurred based on the increase in the rate of decrease in the anode gas pressure. Therefore, similar to the example in the first embodiment, it is possible to detect a cross leak abnormality and other abnormalities separately from each other.

The determination that a cross leak abnormality has occurred may be confirmed after the main determination is repeated a plurality of times.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A fuel cell system comprising:
   a fuel cell in which a plurality of cells are stacked;
   a voltage sensor configured to measure a cell voltage of the fuel cell; and
   a pressure sensor configured to measure an anode gas pressure in the fuel cell, wherein
   a cross leak abnormality is determined based on the cell voltage in a state in which an amount of supply of cathode gas to the fuel cell is secured, only when the cell voltage is lower than a predetermined threshold voltage, the cross leak abnormality is determined based on a rate of decrease in the anode gas pressure, and when the rate of decrease in the anode gas pressure is larger than a predetermined threshold rate, it is determined that the cross leak abnormality has occurred in the fuel cell.

2. The fuel cell system according to claim 1, wherein the determination based on the cell voltage and the determination based on the rate of decrease in the anode gas pressure are performed during a period from start to stop of the fuel cell system.

3. The fuel cell system according to claim 1, wherein the determination based on the cell voltage is performed during an intermittent operation.

4. The fuel cell system according to claim 1, wherein the determination based on the rate of decrease in the anode gas pressure is performed after stop of supply of the anode gas in processing of stopping the fuel cell system.

5. A method of controlling a fuel cell in which a plurality of cells are stacked, the method comprising:

determining whether a cross leak abnormality has occurred based on a cell voltage of the fuel cell in a state in which an amount of supply of cathode gas to the fuel cell is secured; and determining whether a cross leak abnormality has occurred based on a rate of decrease in an anode gas pressure in the fuel cell only when the cell voltage is lower than a predetermined threshold voltage, wherein when the rate of decrease in the anode gas pressure is larger than a predetermined threshold rate, it is determined that a cross leak abnormality has occurred in the fuel cell.

* * * * *

UNITED STATES PATENT AND TRADEMARK OFFICE
CERTIFICATE OF CORRECTION

PATENT NO. : 11,018,357 B2  
APPLICATION NO. : 16/239467  
DATED : May 25, 2021  
INVENTOR(S) : Tomio Yamanaka et al.

Page 1 of 1

It is certified that error appears in the above-identified patent and that said Letters Patent is hereby corrected as shown below:

On the Title Page

Item (72), change:  
"Tornio Yamanaka, Nagoya (JP); Kenji Umayahara, Miyoshi (JP)"  
To:  
--Tomio Yamanaka, Nagoya (JP); Kenji Umayahara, Miyoshi (JP)--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*